March 16, 1971    S. L. BELLINGER    3,570,227
SELF-PROPELLED RANDOM MOTION LAWNMOWER
Filed Jan. 16, 1969    6 Sheets-Sheet 1

INVENTOR
S. LAWRENCE BELLINGER

BY LeBlanc & Shur

ATTORNEYS

INVENTOR
S. LAWRENCE BELLINGER

ATTORNEYS

March 16, 1971     S. L. BELLINGER     3,570,227

SELF-PROPELLED RANDOM MOTION LAWNMOWER

Filed Jan. 16, 1969     6 Sheets-Sheet 6

INVENTOR
S. LAWRENCE BELLINGER

BY Le Blanc & Shur

ATTORNEYS

3,570,227
SELF-PROPELLED RANDOM MOTION LAWNMOWER

S. Lawrence Bellinger, Florissant, Mo., assignor to Mowbot, Inc., Tonawanda, N.Y.
Continuation-in-part of application Ser. No. 405,064, Oct. 20, 1964. This application Jan. 16, 1969, Ser. No. 791,566
Int. Cl. B62d *11/08*
U.S. Cl. 56—25.4      14 Claims

ABSTRACT OF THE DISCLOSURE

Disclosed is a self-propelled lawnmower for cutting grass in a completely random and unattended manner. The unit is preferably propelled by a battery and comprises a frame supported on a pair of front caster wheels and a pair of rear drive wheels. The drive wheels are coupled to a continuously rotating drive shaft by individual clutch-brake mechanisms. When a boundary wire is sensed by coils on the frame, the drive wheel furthest away from the border is unclutched and braked to pivot or turn the mower. No backup motor or complex steering control is required. A pair of adjustable rotary cutter blade assemblies are carried on the frame.

---

This application is a continuation-in-part of copending application Ser. No. 405,064, filed Oct. 20, 1964.

THE INVENTION

This invention relates to a self-propelled random motion device suitable for use as a lawnmower, fertilizer spreader, agricultural implement, and the like, and more particularly to a relatively quiet and substantially fumeless and preferably battery operated lawnmower which cuts a lawn purely through random motion.

As is well known, cutting a lawn, especially during the spring, can be quite burdensome for a busy property owner and often becomes quite a serious problem for the aged and the infirm. For this reason, it has been proposed in the past to provide a lawnmower which needs little or no attendance and acts to automatically cut a lawn in a predetermined area. One device of this type has been proposed which is designed to follow the path of a wire or cable passing back and forth in a predetermined pattern a few inches below the surface of the lawn. Devices of this type suffer the obvious disadvantage that the lawn must be completely torn up to install the buried wire.

In order to overcome this difficulty, random motion lawnmowers have been proposed, such as those shown and described in U.S. Pat. No. 3,128,840 issued Apr. 14, 1964 to A. M. Barrett, Jr. and in my co-pending application Ser. No. 405,064, filed Oct. 20, 1964. The completely random motion device of the above-mentioned U.S. patent and copending application is a device which is retained within a predetermined boundary by a single wire loop which need not necessarily be buried underground and, in any event, does not require extensive disfiguration of a well kept lawn when the boundary wire is installed. The mower is in the form of a self-propelled unit, preferably battery operated, so that it is relatively quite in operation and does not produce the excessive exhaust and obnoxious fumes which necessarily accompany conventional present day gasoline powered engines.

The present invention relates to a self-propelled random motion lawnmower of the type disclosed in the aforementioned copending application and U.S. patent and more particularly to a preferably battery operated random motion lawnmower of improved efficiency and construction and one which requires a minimum of power for operation consistent with the limited power available in a present day commercial battery. In the system of the present invention, the area of the lawn to be cut is surrounded by a single loop of wire or cable A.C. power source of an energy such as to radiate detectable signals at least a few feet in all directions from the wire. Mounted on the self-propelled lawnmower are a plurality of sensing coils which detect a boundary signal radiated from the boundary wire as the lawnmower approaches the boundary and these coils produce a signal which causes the mower to turn around so as to proceed across the area to be cut in a new direction. Important features of the present invention include a drive or propelling system for the lawnmower which requires no separate steering motors or control mechanisms and no reversing motors or reversing switches. This simplification of the steering mechanism in eliminating separate steering and reversing motors, as well as associated clutch and control mechanisms, especially in the preferred case of a battery operated unit, substantially reduces the energy drain from the limited power supply of the onboard battery, thus increasing battery life and increasing the efficiency of the operation of the mower.

In the present invention, a pair of drive wheels are coupled to a continuously rotating drive shaft and mounted in a fixed position such that they need not be turned or rotated to steer the mower. Changes in direction of the mower adjacent the boundary wire are effected through sensing coils which cause one of the rear drive wheels, namely, the drive wheel furthest away from the boundary, to be momentarily uncoupled from the constantly rotating drive shaft and braked while the other drive wheel continues to rotate and propel the mower. This causes the mower to turn or pivot about the momentarily uncoupled and locked wheel. The front end of the mower is supported by a pair of spaced caster wheels such that the mower may be turned about the braked rear drive wheel until the coils no longer receive a signal from the boundary of sufficient magnitude to keep the wheel locked. At this time the locked drive wheel is released and again coupled to the rotating shaft so that the vehicle proceeds in a new path away from rather than toward the boundary. By proper selection of the size, shape and location of the sensing coils, as well as adjustment of the sensing circuit, the angle of incidence of the lawnmower at the boundary may be made approximately equal to the angle of departure, that is, the angle at which the mower proceeds away from the boundary after it has turned or pivoted about the locked outside drive wheel. In order to insure random cutting of all sizes and shapes of areas, including regular geometric patterns, it is necessary that the sensing coils and circuitry be arranged so that the angle of departure is slightly larger than the angle of incidence by a predetermined amount such as about 5°.

The constantly rotating output shaft of the device of the present invention, in conjunction with the combination clutch-brake mechanism for each of the drive wheels, makes possible a consolidated steering, drive and control system for automatically controlling the operation of the mower that is much more simple and reliable than previous systems. In addition to propelling the drive wheels, the battery may supply current to motors driving a pair of rotating blade mechanisms which are constructed to further reduce the load drain on the battery. In addition to low power requirements, the double rotary cutters, i.e., side-by-side cutter units of small diameter, develop less kinetic energy than a single larger diameter cutter blade and therefore are much safer in operation and far less likely to discharge dangerous rocks and stones in the manner of conventional rotary lawnmowers.

In the preferred embodiment of the present invention, the unit takes the form of a battery operated self-propelled lawnmower. It is apparent, however, that the simplified and consolidated construction of the present invention is also applicable to other forms of drive units, such as gasoline engines. In addition, the present invention is not limited to lawn cutting but is applicable to all types of self-propelled vehicles, including but not limited to agricultural implements such as fertilizer spreaders and the like.

It is therefore one object of the present invention to provide an improved self-propelled vehicle for cutting lawns and spreading fertilizer, and performing other agricultural or like random motion functions.

Another object of the present invention is to provide a new and improved self-propelled random motion lawnmower.

Another object of the present invention is to provide an improved self-propelled battery operated random motion lawnmower.

Another object of the present invention is to provide a lawnmower having increased simplicity and reliability incorporating a consolidated control, drive and steering mechanism which completely eliminates the need for separate steering and reversing motors.

Another object of the present invention is to provide a self-propelled rotary lawnmower having a pair of drive wheels coupled to a continuously rotating shaft. The mower is supported by the two drive wheels and by a pair of caster wheels such that when one of the drive wheels is uncoupled or declutched from the drive shaft and substantially simultaneously braked, the other drive wheel causes the mower to turn or pivot about the braked wheel.

Another object of the present invention is to provide an improved, randomly operated, self-propelled lawnmower of the battery type which cuts grass through random motion and may be used for extended periods of time with little irritation to neighbors since it is relatively quiet and produces a minimum of exhaust or fumes. A pair of rear drive wheels are each connected by a combination clutch-brake to a continuously rotating drive shaft. The front end of the power mower is supported by a pair of caster wheels so that the device is freely pivotable about one of the rear drive wheels when it is unclutched from the drive shaft and simultaneously braked by its combination spring-clutch-brake. Carried by the unit are a pair of rotary blade assemblies each comprising a circular dish at the periphery of which are mounted a plurality of small pivoted knife-like blades. The blade assemblies constitute light weight, low inertia devices which while effective to cut even relatively thick lawns impart a minimum of load to the power supply and because of reduced kinetic energy are more safe to operate. The blades are light weight and are mounted to pivot inwardly in the event they encounter an obstruction as the lawnmower moves automatically in an unattended manner across a lawn to be cut.

A further object of the present invention is to provide an improved combination clutch-brake mechanism for self-propelled vehicles and particularly random motion lawnmowers.

These and further objects and advantages of the present invention will be more apparent upon reference to the following specification, claims, and appended drawings, wherein:

Figure 1:
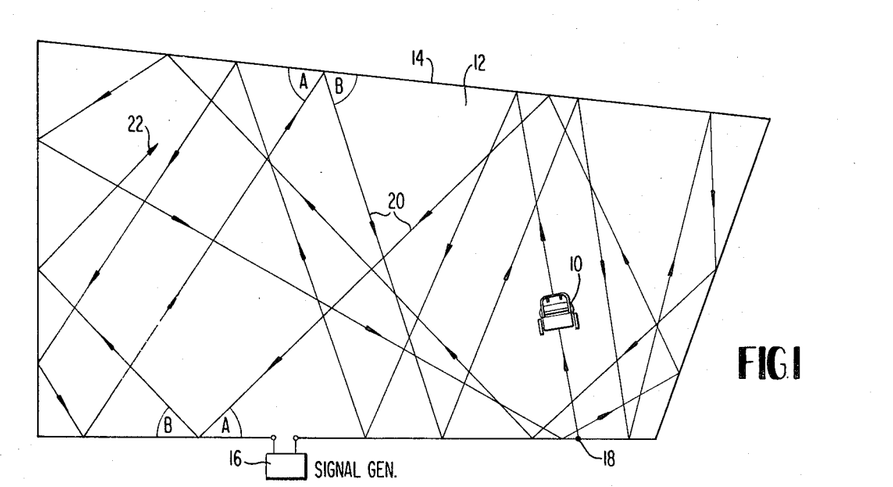
FIG. 1 is a diagrammatic view showing a random motion pattern of a lawnmower constructed in accordance with the present invention over a predetermined area of arbitrary shape.

Referring to the drawings and particularly to FIG. 1, the mower of the present invention, generally indicated at 10 in that figure, traverses an area 12 bounded by a single looped wire 14 connected to a border signal generator 16. Generator 16 supplies signals through wire 14 of sufficient power such that the signals are radiated from the wire for a distance of at least several feet in an area surrounding the wire and perpendicular to it. By way of example only, generator 16 may supply alternating current signals to the wire 14 at a frequency of approximately 2 kHz.

As lawnmower 10 approaches a boundary of the area 12 and more particularly the wire 14, sensing coils on the lawnmower intercept signals from the wire causing the mower to pivot or turn and to assume a new direction away from the previously approached wire. In FIG. 1, the lawnmower is illustrated as starting from a point 18 near the lower right hand end of the boundary wire 14 and alternating back and forth across the lawn area 12 in the direction of the arrowed paths 20. Only a portion of the overall lawnmower path is illustrated for the sake of clarity, the path shown terminating at arrowhead 22. It is understood that, depending upon the shape and the size of the area 12 bounded by the wire 14, the lawnmower traverses across the area many, many times in a random fasion such that substantially all of the area 12 within the wire 14 is at one time or another passed over by the mower until the lawn is completely cut.

In each case, the angle of incidence or approach A to the boundary wire 14 is substantially equal to the angle of departure B, that is, the angle at which the lawnmower proceeds away from the boundary after pivoting or turning to change directions. These angles are chosen to differ by a predetermined amount, such as, for example, 5°, so that the angle of departure B is slightly larger by this amount than the angle of incidence A. In this way, it is possible to obtain random motion in all shapes including circular or regular geometrical lawn configurations. The lawn area 12 is illustrated as substantially trapezoidal but this is simply an arbitrary selection chosen for the purposes of illustration and it is understood that the boundary wire may take any closed configuration consistent with the area of the lawn to be cut. Since the signal on wire 14 is a communication type signal at low power, the wire 14 presents no hazard and need not be heavily insulated. It preferably is embedded a few inches beneath ground surface at the edge of the lawn, but, if desired, may simply be laid over the ground and fastened down around the edge of the lawn to be cut. It, of course, may be supported a few inches above ground if the sensor orientation and sensitivity are suitably adjusted.

Figure 2:
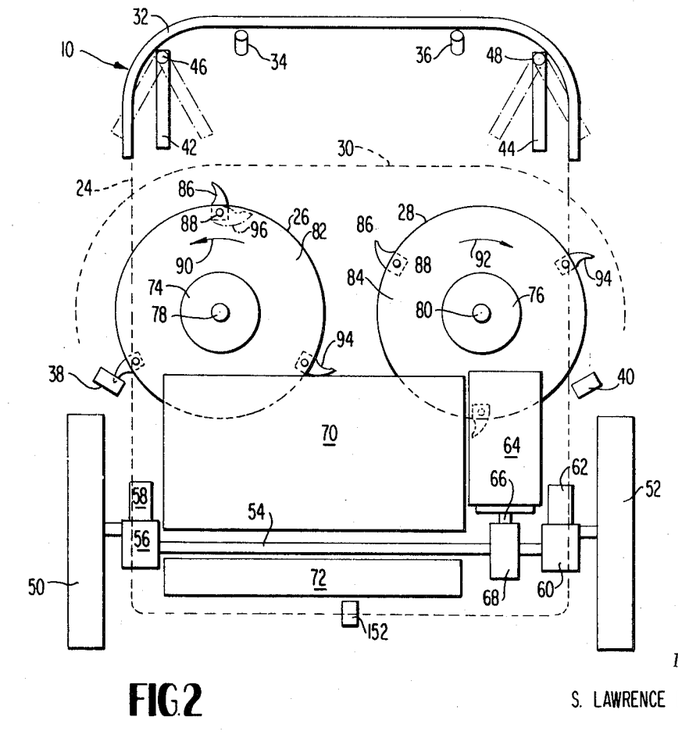
FIG. 2 is a simplified and partially diagrammatic plan view of an automatic lawnmower of the self-propelled battery type constructed in accordance with the present invention.

FIG. 2 is a simplified plan view of the mower which is illustrated as comprising a frame indicated by dashed lines at 24 upon which is mounted a pair of cutting blade assemblies 26 and 28, these latter assemblies partially enclosed by a protective shield indicated by dashed lines 30. On the front and extending around the sides of the frame is a resilient bumper switch 32 more fully described below and also mounted at the front of the lawnmower frame are a pair of front sensing coils 34 and 36. Additional lateral sensing coils 38 and 40 are mounted on each side of frame 24, left hand side sensing coil 38 as viewed from the top cooperating with left-hand front coil 34 and right-hand side sensing coil 40 similarly cooperating with right-hand front coil 36.

Figure 4:
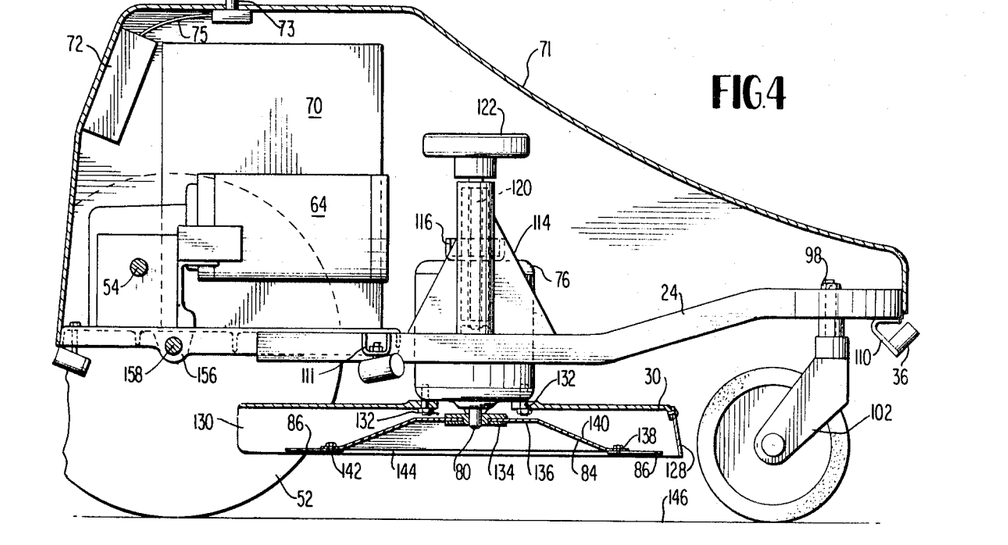
FIG. 4 is a side view of the lawnmower shown in FIG. 3.

Depending from the forward end of frame 24 are a pair of caster wheels 42 and 44 which not only rotate but are free to pivot in a well known manner as indicated by dashed lines about the longitudinal axis of shafts 46 and 48 perpendicular to the plane of the paper in FIG. 2. The unit 10 is also supported by and propelled by a pair of rear drive wheels 50 and 52. Wheel 50 is coupled to a continuously rotatable drive shaft 54 by a combination clutch-brake 56. Clutch-brake 56 is operated and controlled by a solenoid 58. The other drive wheel is similarly coupled to shaft 54 by a second combination clutch-brake 60 controlled by electrical solenoid 62. Solenoids 58 and 62 are selectively operated in response to signals from the sensing coils 34 and 36 and 38 and 40 previously described. An electric drive motor 64 continuously drives shaft 54 by way of a stub shaft 66 and worm gear 68. Motor 64 is energized from a heavy duty truck-type rechargeable battery 70. Mounted on the frame is a removable closure or cover 71 to which is attached an electronic control package 72, as best seen in FIG. 4, including a control panel accessible from the outside rear of cover 71. Secured to the top of cover 71 is a stop button 73 electrically connected by leads 75 to electronic package 72. By depressing button 73, the mower may be manually stopped at any time.

Also mounted on the frame 10 and energized from battery 70, are a pair of cutter motors 74 and 76 which drive shafts 78 and 80 on which are mounted beneath the frame 24 dish-shaped rotors 82 and 84. Mounted at the edge of each of the rotors 82 and 84 are three blades 86 pivoted to the respective rotors at 88. The blades move radially outwardly to assume the solid line position illustrated under the influence of centrifugal force as the rotors 82 and 84 rotate counter to each other in the directions illustrated by the arrows 90 and 92. However, should the leading sharpened edge 94 of one of the blades meet an obstacle, the blade freely pivots about pivot point 88 to the dotted line position illustrated at 96 to clear the obtacle. The blades are preferably razor sharp but are of such light weight that they impact with a minimum of force on an uncuttable obstacle such as a rock, wire, or the like. The blades may take many desired forms but in the embodiment illustrated are modified commercially available blades.

Figure 3:
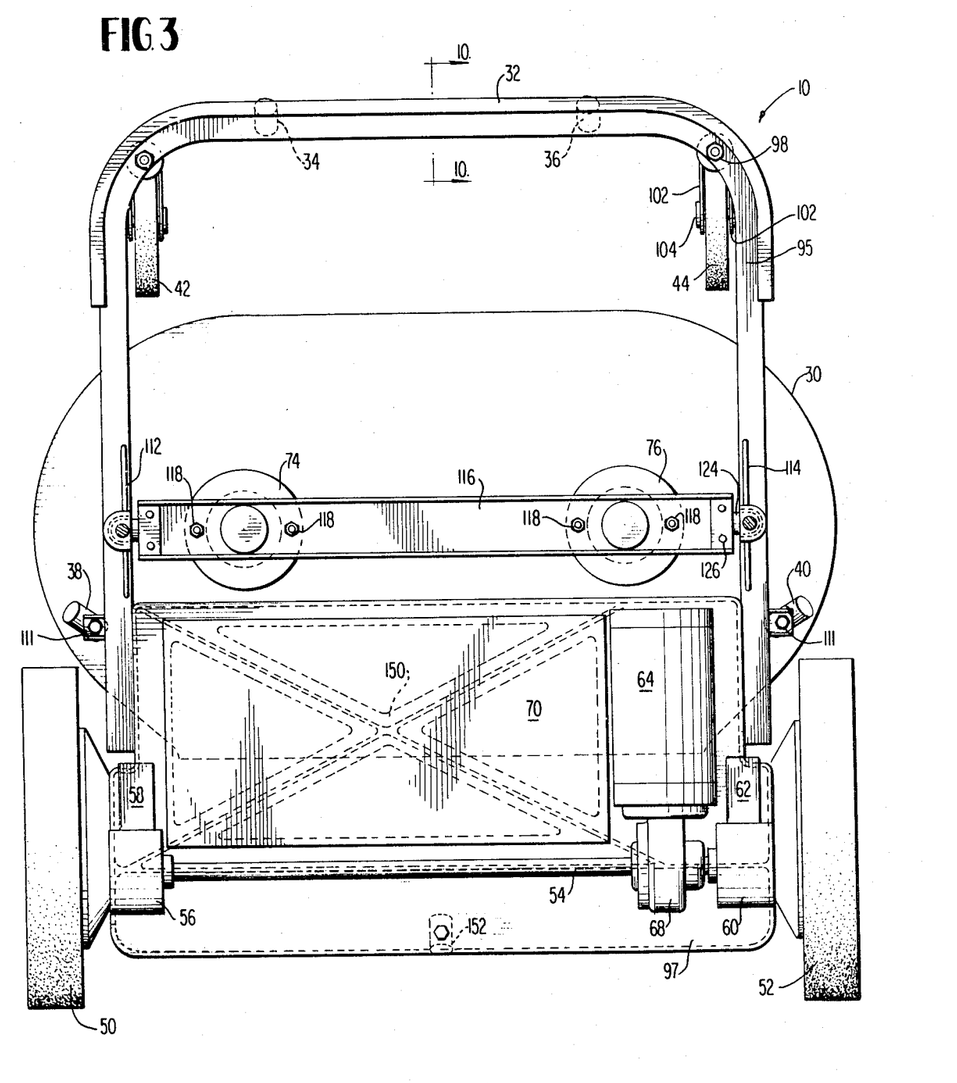
FIG. 3 is a more detailed top plan view of the lawnmower of FIGS. 1 and 2.

FIG. 3 is a more detailed plan view of the mower 10 and FIG. 4 is a side view taken at right angles to the view shown in FIG. 3. Frame 24 takes the form of a hollow tubular rod 95 of rectangular cross section bent into a substantially U-shape as illustrated in FIG. 3, and carrying at its front end the bumper 32. This rod is attached at its rear to a shelf 97. Depending from the front end of the frame, as best seen in FIG. 4, are a pair of 5 inch diameter caster wheels 42 and 44. Passing through suitable apertures in the front of the frame and secured by a nut 98 is a swivel bracket 100 or caster having spaced, depending arms 102 receiving shaft 104 about which wheel 44 rotates. Swivel bracket 100 is rotatable about bushing 106. Thus, wheel 44 in a well known manner is free to pivot about the axis of swivel bracket 100 perpendicular to the plane of the frame and also is rotatable about shaft 104.

Coils 34 and 36 are secured to the front end of the frame by suitable brackets 110. The coils preferably form a small angle with the horizontal as illustrated at 36 in FIG. 4 and the two forward facing coils 34 and 36 angle outwardly toward the front of the mower at a slight angle away from the centerline passing through the mower. Side coils 38 and 40 are similarly secured to the frame by brackets 111.

Connected to opposite sides of the frame are a pair of standards 112 and 114 to which are connected a cross bar 116. Attached to the underside of cross bar 116 by a pair of bolts such as the bolts 118 in FIG. 3 are the cutter motors 74 and 76. The height of the motors 74 and 76 and hence the cutters to which they are connected may be adjusted by means of a pair of screws, one rotatable in each of the standards 112 and 114. As best seen in FIG. 4, standard 114 receives a screw 120, the upper end of which is rigidly connected to a knob 122. Screw 120 is rotatably received in the standard and engages a projecting tongue 124 (FIG. 3) projecting into the standard and which tongue forms part of a bracket 126 bolted to one end of a cross bar 116. Thus, as the knob 122 is rotated to rotate screw 120 in the standard, threaded bracket 126 rides upwardly and downwardly along the screw depending upon the angular direction of rotation of the knob to raise or lower that end of the cross bar 116. It is understood that a similar knob and screw is provided in standard 112 so that the other end of the cross bar 116 may be similarly adjusted in height for the purposes of leveling the two cutter assemblies and also for the purposes of raising and lowering both cutter assemblies to adjust the height to which the grass is cut.

Attached to the lower end of each of the motors 74 and 76 is a single shield 30 closed at its forward end by a comb plate 128 (FIG. 4) but completely open at its rear end 130 so that grass may exit from the shield. The shield is connected to the mowers by bolts 132. Secured to the output shaft 80 of each of the motors is a split hub 134 and this hub engages the center of a rotor 84 having a circular outer edge and bent in the shape of an inverted dish. The central annular portion 136 of the rotor is flat as is the annular outer edge 138 and these inner and outer edges are joined by a conically-shaped intermediate portion 140. Blades 186 are pivoted to the flat annular edge 138 and more specifically are pivoted to the underside of the rotor by a nut and screw assembly generally indicated at 142. There are preferably three blades 86 connected to each rotor and these blades are spaced at equal angles around the rotational axis of the rotor. The plane of the blades 86 is just above the lower edge 144 of shield 30 and this lower edge is in turn slightly spaced from ground level, indicated at 146, which supports the front and rear wheels, two of which are shown in FIG. 4 at 44 and 52. As previously described, the height of the motors 74 and 76, and hence the spacing of the blades and shield from the ground 146, may be adjusted by knobs 122.

Behind the motors 74 and 76 and supported in a holder indicated by dashed lines at 150, is a heavy duty 12-volt truck battery, preferably rated at 80 ampere hours. This battery is connected to electrical circuitry in control box 72 which also connects to the sensing coil an a manner more fully described below. The battery is connected to drive cutter motors 74 and 76 and is also connected to power the drive motor 64. The output of this motor is connected through a worm gear 68 to the constantly rotating drive shaft 54 spaced slightly above shelf 97. Control box 72 carries some of the circuitry shown and described in more detail in FIGS. 8 and 9 below. Depending from the rear end of the shelf is a "kill" sensor coil 152.

Figure 5:
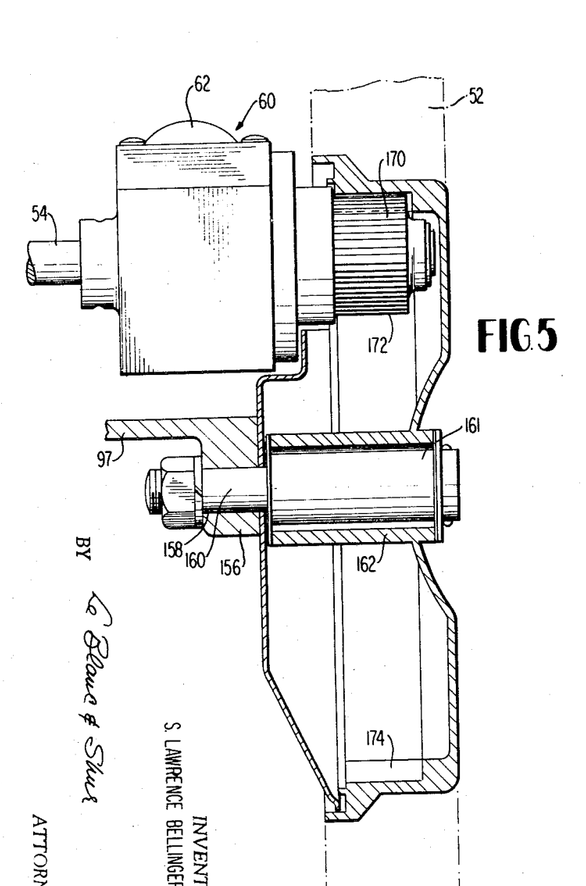
FIG. 5 is a view with parts in section showing how one of the drive wheels is coupled to the continuously rotating drive shaft.

FIG. 5 shows the details of the arrangement for coupling one of the drive wheels 52 to the lawnmower 10. Shelf 97, forming part of the frame, is provided with a depending flange 156 having an aperture 158 receiving an axle 160. Rotatably mounted on axle bearing 161 is a hub 162 over which is mounted rubber wheel 52.

Hub 162 and consequently wheel 52 is rotated by shaft 54 through a combination clutch-brake mechanism generally indicated at 60 in FIG. 5. The clutch-brake 60 comprises an input hub 166 and an output hub 168. Input hub 166 is keyed to shaft 54 whereas output hub 168 is rotatably mounted on the shaft. Mounted on output hub 168 is a gear 170 having teeth 172 adapted to mesh with corresponding internal teeth 174 of wheel hub 162. The clutching and braking action effected through unit 60 by means of which shaft 164 drives wheel 52 through gear 170 may be best understood by reference to FIGS. 6 and 7 which are enlarged cross sectional views of the clutch-brake mechanism 60.

Figure 6:
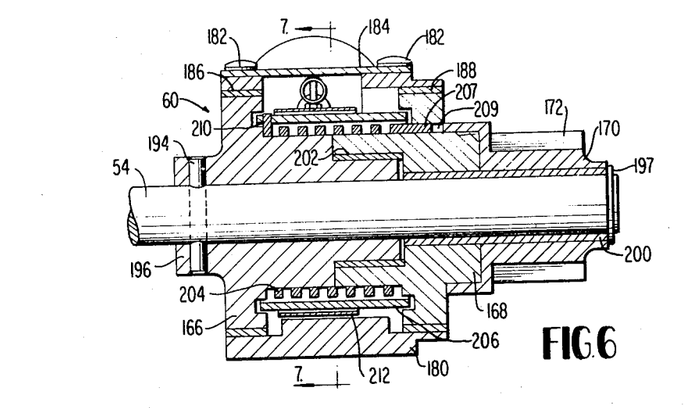
FIG. 6 is a cross section through one of the combination clutch-brakes coupling the continuously rotating drive shaft to one of the drive wheels.
Figure 7:
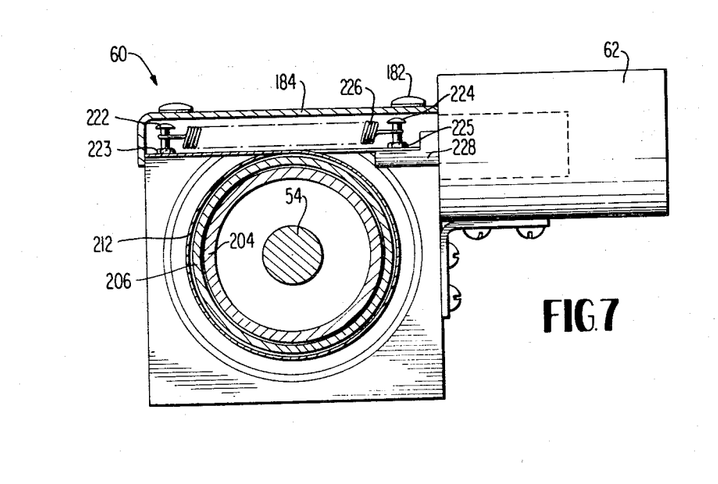
FIG. 7 is a cross section through the clutch-brake of FIG. 6 at right angles to that of FIG. 6 and taken along line 7—7 of that figure.

Referring to FIGS. 6 and 7, the combination clutch-brake generally indicated at 60 comprises a housing 180 suitably mounted to the frame of the vehicle. Attached to the housing 180 by screws 182 is a removable access plate 184 for a purpose later to be described. Within the housing are a pair of annular bearings 186 and 188, the former supporting input hub 166 and the latter supporting output hub 168. Input hub 166 is keyed for rotation with the drive shaft 54 by a spiral pin 194, passing through flange 196 on the hub. In this way, the input hub 166 is rigidly secured to shaft 54 and continually rotates with it in bearing 186. Secured to output hub 168 by a ring 197 attached to the end of shaft 54 is gear or pinion 170.

During braking of drive wheel 52, it is necessary that pinion 170 and output hub 168 remain stationary while shaft 54 continues to rotate and for this reason the output hub and pinion are mounted on the shaft by an oilite bushing 200 forming a bearing between the shaft and these two elements. Output hub 168 is spaced radially from input hub 166 by a second oilite bushing 202 forming a bearing surface between the two hubs.

Surrounding the input hub 166 and output hub 168 is a metallic coiled spring 204 which normally tightly engages the hubs for the transmission of drive power from shaft 54 through the hubs to the pinion 170 and hence wheel 52 of FIG. 5. Surrounding coil spring 204 is an annular metal sleeve 206 apertured to receive the upturned end 210 of coil spring 206. Projection 210 formed by the end of the spring is at the power input end of the spring, i.e., that end engaging input hub 166. The other end of spring 204 is turned over as at 207 and this projecting end of the spring is received through a hole 209 in the driven hub 168 so that the output or driven end of the spring is effectively connected to the hub, i.e., retained by spring tension in the hole 69.

Loosely wrapped around sleeve 206 and normally slightly spaced from it is an actuator in the form of a metal strap 212. Strap 212 is elongated with a reduced end or tongue at one end adapted to pass through an aperture in the other end so that it may be looped about sleeve 206 in the manner illustrated in FIG. 7. This loop may be tightened down over the sleeve 206 by pulling on one or both ends of the strap.

Referring to FIG. 7, a screw 222 passes through one end of the strap and over this is threaded a clamp nut 223 by means of which one end of the actuator strap 212 is attached to housing 180. The other end of the strap is attached by a second screw 224 and clamp 225 to the core 228 of solenoid 62. Access is had to these nuts and screws by removing access plate 184. When the coil of solenoid 62 is energized, core 228 is drawn into the coil, i.e., moves in the right hand direction in FIG. 7, so as to tighten strap 212 about sleeve 206 to prevent the sleeve from rotating. When the solenoid is no longer energized, the core 228 is returned to its initial position by a helical coil tension spring 226. This insures that the strap will release the sleeve 206 when the solenoid is deenergized.

Figure 8:
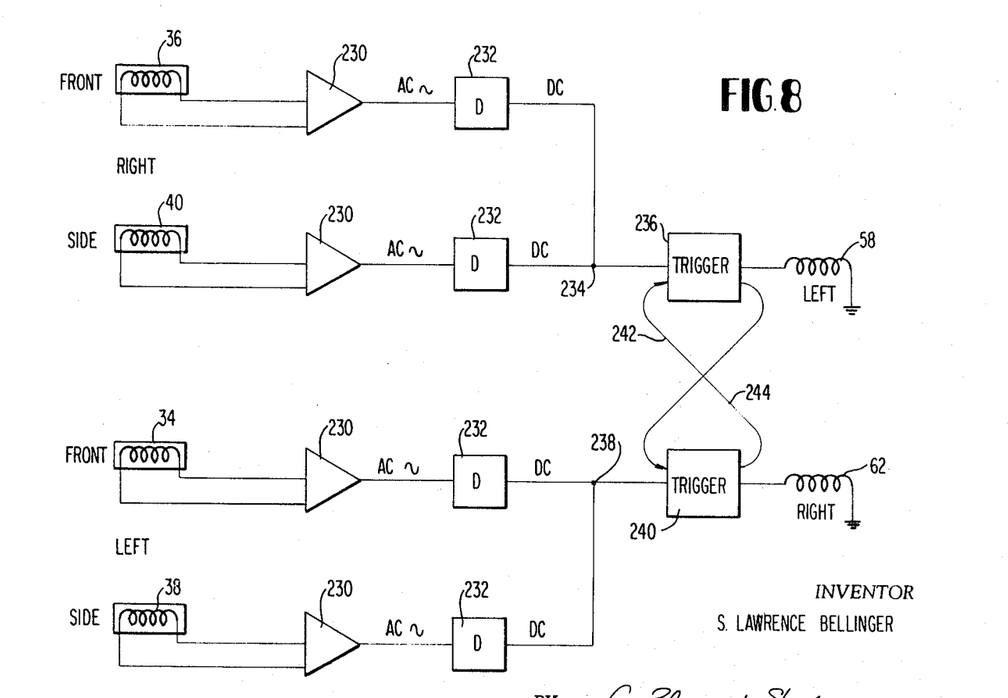
FIG. 8 is a schematic diagram of a control circuit for the mower of the present invention.

FIG. 8 is a simplified block diagram of the control circuit for the lawnmower 10. It shows opposite ends of each of the sensing coils 34, 36, 38, and 40 connected to the input of an AC amplifier 230. The amplifiers 230 are all of identical construction and supply an output to identical detectors or rectifiers 232. The direct current output from the detectors for the right hand sensors are combined at 234 and supplied to a first Schmitt trigger 236 feeding the left clutch-brake solenoid 58. Similarly, the direct current output from the detectors 232 for the left hand sensing coils 34 and 38 are combined at 238 and fed to a second Schmitt trigger 240, feeding the right hand clutch-brake solenoids 62. The output of Schmitt trigger 240 is connected by way of lead 242 to the input of trigger 236 and similarly the output of this trigger is connected by way of lead 244 to the input of trigger 240. By this cross coupling connection when one of the triggers is rendered conductive to supply a pulse to its solenoid 58 or 62, the trigger also produces a disabling pulse by way of one of the leads 242 or 244 to disable the other trigger during the time the first trigger is conducting. This assures that both wheels will not be declutched and braked at the same time since the operation of the trigger braking and unclutching one wheel disables the electrical feed to the controlling solenoid for the clutch-brake of the other wheel.

Figure 9:
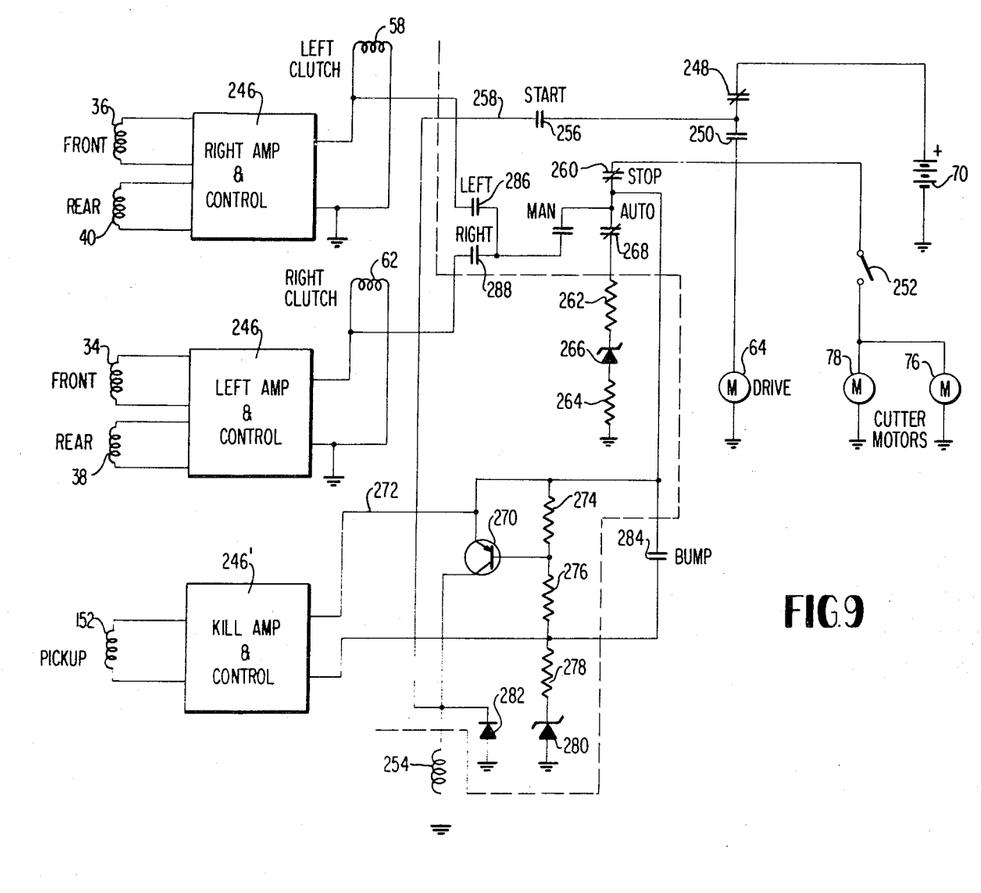
FIG. 9 is a circuit diagram of the drive circuits for the lawnmower of the present invention.

FIG. 9 is a more detailed circuit diagram of the control circuit for the mower 10 of this invention. This figure again shows the sensing coils 34, 36, 38, and 40 connected through amplifiers and control circuits of the type illustrated in FIG. 8 labeled generally 246 to the left clutch solenoid 58 and right clutch solenoid 62. In the upper right hand corner of this figure, battery 70 is shown as connected through a safety switch 248 and a normally open pair of relay contacts 250 to drive motor 64. A manual switch 252 also connects the battery to the cutter motors 76 and 78.

The relay coil is illustrated at 254 in FIG. 9 and when this coil is energized, contacts 250 are closed completing the power circuit from the battery 70 to the propulsion drive motor 64 and to the cutter motors 76 and 78 if switch 252 is closed. Relay coil 254 is connected to the battery through a start switch 256 by way of lead 258 which switch is preferably in the form of a momentarily depressible button which is temporarily depressed to connect coil 254 across the terminals of the battery after which time the relay locks in and remains energized until a normally closed manually operated stop switch 260 is opened. Stop switch 260 is connected in series with voltage dropping resistors 262 and 264 and voltage controlling Zener diode 266 normally closed automatic switch 268 completes this portion of the circuit for a purpose more fully described below.

Relay coil 254 is connected to the collector of a PNP junction transistor 270 which has its emitter and base coupled by way of lead 272 to the output of an amplifier control circuit 246' receiving a signal from the rear sensing coil or "kill" sensing coil 152. The base of transistor 270 receives a bias signal from the battery by way of voltage divider or potential dropping resistors 274, 276, and 278 connected in series with voltage regulating Zener diode 280. Relay coil 254 is of the self-latching type such that once it is energized it remains on and is bypassed by a rectifying diode 282. A normally open bumper switch 284 also is connected to the relay circuit which bumper switch is shown and described in more detail below in conjunction with FIG. 10.

Connected between the automatic-manual switch 268 and left clutch solenoid 58, is a left manual switch 286 and similarly connected to right solenoid 62 is a right manual switch 288. The portions of the circuitry illustrated in FIG. 9 mounted on a printed circuitboard in the control box 72 are to the left of the dashed line 290.

Figure 10:
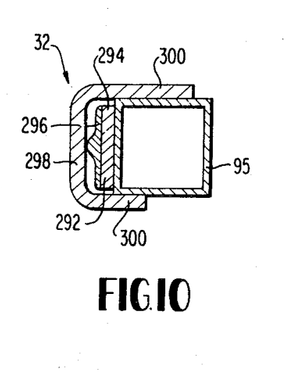
FIG. 10 is a cross section through the front bumper switch taken along the line 10—10 of FIG. 3.

FIG. 10 is a cross section taken along line 10—10 of FIG. 3 through the front bumper. The bumper, generally indicated at 52, is connected to the hollow rectangular cross sectioned pipe 95 forming the front part of the lawnmower frame. Attached to the leading or forward face 292 of the tube 95 with permacell doublebacked tape is a rear bumper part 294. Similarly, a layer of permacell doublebacked tape attaches switch 296 to the rear part of bumper 294. This in turn is covered by a resilient bumper front of generally U-shaped cross section 294 having a top flange 300 and bottom flange 302 bonded to the frame with a suitable adhesive. Resilient bumpers of this type per se are well known and further elaboration is deemed unnecessary.

It is apparent from the above that the present invention provides an improved and simplified self-propelled vehicle which when battery operated is substantially fumeless and operates with a minimum of noise. Because of the elimination of the need for steering actuators and reversing mechanisms and the complicated motor and control systems attendant thereto, it has been found that the self-propelled vehicle of the present invention is more economical to construct and operate and may be used witht increased efficiency and reliability. The double rotor construction reduces the load on the power source and introduces a significant safety feature in that the rotating blades have far less kinetic energy than conventional rotary mowers.

A conventional 80 ampere hour 12-volt truck battery, if properly maintained, will last through approximately three seasons of lawn cutting before it needs to be replaced. The battery is preferably of the rechargeable type so that it may be recharged overnight or between cuttings when the mower is not in use. For this purpose, the border signal generator 16 in FIG. 1 may incorporate suitable apparatus and circuitry for connection to the lawnmower battery so that the battery may be plugged into it and recharged.

The area of the lawn 12 may be of any desired size and shape since the mower moves in a purely random manner across it. It has been found that when operating at conventional lawnmower speeds, the optimum area of the lawn 12 to be moved at one time varies from approximately 5000 to 7000 square feet, depending upon the number of obstacles within the area. A flat clear area of about 7000 square feet can be cut on one battery charge. Areas larger than 7000 square feet are preferably split into smaller increments so that each section can be thoroughly cut on a single battery charge. The area will normally be completely cut after a period of from about 3 to 3½ hours. The machine is constructed and designed to travel at normal lawnmower cutting speeds of approximately 1 to 3 miles per hour and is capable of going up and down steep slopes and is provided with sufficient safety features so that it may be operated completely unattended.

An important feature of the present invention resides in the fact that it has been found by horticulturists that random cutting compared to routine patterns results in healthier lawns. That is, the random cutting means that the machine cuts the lawn differently each time resulting in a healthier, thicker carpet of grass. Furthermore, it has been found that repeated crossings of the random motion device over already cut areas has the effect of chopping up the grass into very fine particles and similarly chops up leaves which may have fallen on the grass into a fine powder so that no raking is necessary.

The mower of the present invention does not travel backwards. Drive wheels 50 and 52 are fixed in orientation and both propel and steer the mower in a straight or substantially straight line until a boundary wire is approached, at which time the mower simply pivots or turns about one drive wheel and then proceeds along a straight line in a new direction. Because it is designed for completely unattended operation, the mower is provided with a rear sensing coil 152 which control a "kill" circuit to disable relay 254 of FIG. 9. That is, if for some reason the lawnmower, when approaching the boundary, does not change direction because of failure of one of the front or side sensing coils, or for any other reason, but instead continues over the wire, passage of the rear coil 152 over the boundary wire automatically turns the lawnmower off and it comes to an abrupt halt. This is brought about by applying an impulse from pickup coil 152 in FIG. 9 through the amplifier to the base of transistor 270 shutting off the transistor and therefore reducing the current through relay 254 below the self-sustaining latching level so that the relay becomes deenergized and switch contacts 250 connecting motors 64, 76 and 78 to battery 70 are open.

As an additional feature, front bumper switch 284 in FIG. 9 is provided primarily for the purpose of avoiding injury to children. Random motion devices of this type are quite attractive to small children and should a small child or other person stand in the way of the lawnmower, contact of the child's leg with the front bumper 32 closes the bumper switch 284 of FIG. 9 to deenergize relay 254, open contacts 250, and turn off the entire unit. Closure of contacts 284 place a short circuit across resistors 274 and 276 removing bias from transistor 270 and turning off the transistor to deenergize relay 254 of FIG. 9. Thus, should the mower bump into any object large enough to actuate the bumper, the machine is immediately deenergized and will not operate until the start buttom 256 is again manually depressed.

The lawnmower may be manually operated through the manual switches 286 and 288. That is, when switch 218 is moved from the automatic to the manual position, battery power is supplied through the closed relay contacts 250 and stop switch 260 to the manual control switches 286 and 288. When the switch 286 is closed, the battery is connected to the left clutch solenoid 58 and the mower will turn to the left until switch 286 is open. Similarly, if switch 288 is manually closed, battery power is connected to right clutch solenoid 62 and the mower will turn to the right until switch 288 is released or open. This makes it possible for the operator to manually walk the mower along, i.e., when the mower is finished cutting, the owner by operating switches 286 and 288 may "walk" the mower back to the battery charger of border signal generator 16 where it may be plugged in for recharging. If desired, a "leash" may be connected to the mower for this purpose in a manner disclosed in the aforementioned copending application Ser. No. 405,064, filed Oct. 20, 1964.

Figures 11, 12, 13, 14, 15, 16:
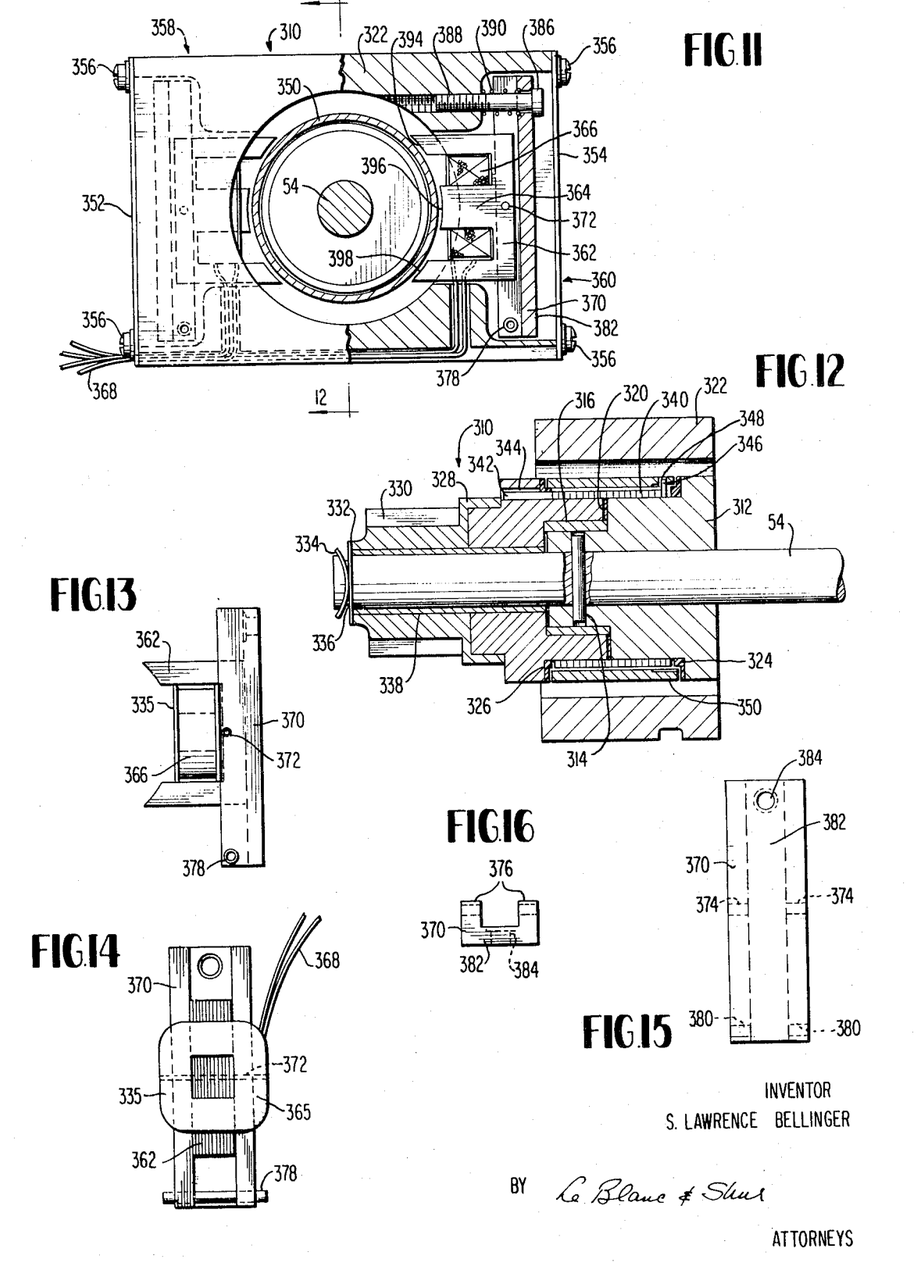
FIG. 11 is a cross section through a modified and preferred form of combination clutch-brake mechanism usable in the lawnmower of the present invention.
FIG. 12 is a cross section through the modified clutch-brake taken along line 12—12 of FIG. 11.
FIG. 13 is a side view of the coil and lever assembly for the clutch-brake of FIGS. 11 and 12.
FIG. 14 is a front view of the coil and lever assembly of FIG. 13.
FIG. 15 is a front view of the lever forming a part of the clutch-brake of FIGURES 11 and 12.
FIG. 16 is a top plan view of the lever of FIG. 15.

FIGS. 11 and 12 show a modified and preferred combination clutch-brake mechanism usable in the self-propelled vehicle of this invention. The combination clutch-brake illustrated in FIGS. 11 and 12 is in many respects similar to the combination clutch-brake mechanism of FIGS. 6 and 7. An important feature of the preferred clutch-brake of FIGS. 11 and 12 resides in the fact that it eliminates the necessity for the separate solenoid such as the solenoid 62 of FIG. 7.

Referring to FIGS. 11 and 12, the combination clutch-brake is generally indicated at 310 and again is used in conjunction with the continuously rotating drive shaft 54. For the sake of clarity, the clutch-brake 310 in FIGS. 11 and 12 is illustrated as connected to the opposite end of shaft 54 from the clutch-brake of FIG. 6 but it is understood that a similar clutch-brake may be provided at the other end of the shaft, the two clutch-brakes being identical except for the right hand/left hand transposition. Clutch-brake 310 comprises an input hub or drive hub 312 keyed to drive shaft 54 by a ⅛ x ¾ inch roll pin 314 passing through aligned apertures in hub 312 and drive shaft 54. Separated from drive hub 312 by a bearing or bushing 316 is a driven hub 318. The two hubs are also spaced by a bearing washer or Nylotron washer 320. The input and output hubs are mounted in an aluminum cast housing 322.

Fitted over the end of output or driven hub 318 is a pinion 328 having teeth 330 adapted to engage with and rotate one of the drive wheels, such as the drive wheel 50 of FIG. 2. Overlying the end of a pinion is a Nylotron washer 332 and resiliently bearing on it is a spring washer or Tru-Arc 334 which surrounds a reduced section or portion 336 adjacent the end of drive shaft 54. The output hub and pinion are spaced from the drive shaft by a bearing or bushing 338. Surrounding and engaging both the drive hub 312 and the driven hub 318 is a coiled helical spring 340 having an outwardly extending end 342 received in aperture 344 formed in the driven hub 318 so that this end of the spring is effectively locked to the driven hub. The other end of spring 340 has an upturned end 346 received through an aperture 348 in a metal ring or sleeve 350 so that this end of the spring is effectively locked to the sleeve. Sleeve 350 is spaced from drive hub 312 and driven hub 318 by respective Nylotron washers 324 and 326.

The operation of the combination clutch-brake of FIGS. 11 and 12 is similar to the operation of the clutch-brake of FIGS. 6 and 7 as previously described. That is, during running of the vehicle, rotation of shaft 54 rotates drive hub 312 to which it is connected. The drive hub is coupled to the driven hub 318 and pinion 328 through helical spring 340. When it is desired to unclutch and brake the pinion (and the wheel to which it is coupled), metal sleeve 314, which normally rotates with the hubs because of the spring projection 346, is stopped. Stopping of the sleeve stops one end of the spring, causing the spring to expand and release the drive hub 312. In this way the pinion and wheel to which it is coupled by teeth 330 is uncoupled from the drive shaft and drive hub 312. At the same time, the driven hub 318 and pinion are braked since one end of the spring is locked to the stopped sleeve 314 and the other end of the spring is effectively locked to the driven hub by its reception in aperture 344 of the hub. Thus, the driven hub is both uncoupled and braked by spring 340. When sleeve 350 is released, the spring contracts and is again free to rotate with the drive hub, releasing the braking action and again coupling the drive shaft through the hubs to pinion 328.

Referring to FIG. 11, aluminum housing 322 is closed off at each end by covers 352 and 354 attached to the housing by machine screws 356. Mounted within the housing immediately adjacent the covers are a pair of solenoid assemblies, generally indicated at 358 and 360, for stopping sleeve 350. Since the solenoid assemblies 358 and 360 are of identical construction only one, i.e., assembly 360, will be described in detail. Solenoid assembly 360 comprises a laminated core 362 formed from a stack of flat substantially E-shaped laminations. Surrounding the center leg 364 of the core is a spool or bobbin 335 around which is wound many turns of electrical wiring to form an energizing electrical coil 366. The coils of the two assemblies are coupled to the control box of the vehicle by way of suitable electrical leads indicated at 368.

Core 362 is pivoted to a lever 370, shown in detail in FIGS. 15 and 16, by means of a 1/16 by 3/4 inch stainless steel pin 372 passing through apertures 374 in the spaced legs 376 of the lever. Thus, the coil and core float on the lever, i.e., are free to rotate or pivot about the axis of pin 372. The lever is in turn pivoted to aluminum housing 322 by a 1/16 by 1 5/8 inch stainless steel pin 378 whose ends are supported in suitable cavities in the housing. Pin 378 passes through apertures 380 in the spaced legs 376 of the lever.

The upper end of the lever base 382 is apertured as at 384 to receive a Nylock bolt 386 threaded into the housing at 388. Surrounding the smooth portion of the bolt shank is a compression spring 390 which bears at one end against the housing and at its other end against the base 382 of lever 370. Aperture 384 is substantially larger in diameter than the shank of bolt 386 so that the lever may pivot about the axis of pin 378 with the spring 390 urging the lever in the clockwise direction illustrated in FIG. 11. The head of bolt 386 acts as a stop for the lever limiting its clockwise movement.

In operation, when the sensing coils of the self-propelled machine sense the approach of the boundary, a sensing signal is fed over wires 368 to the coils of the two assemblies 358 and 360. Energization of the coil 366 causes a flux to flow through the laminations of core 364 attracting the core to the steel sleeve 350. This attraction results in a pivotal movement of lever 370 about the axis of pin 378 in a counterclockwise direction until the curved faces 394, 396 and 398 of the core frictionally engage the outer surface of the sleeve to prevent it from rotating. The faces are machined to a curvature corresponding to the curvature of the sleeve and the action of the core afforded by pin 372 permits a slight adjustment for wear and slight misalignment so that the faces of the core tightly engage the sleeve and prevent it from rotating. Thus, energization of the coils of the two units 358 and 360 cause their respective cores to simultaneously engage the sleeve 350 to frictionally bring it to a rapid stop and hold it against rotating as long as the coils are energized.

After the machine has turned or pivoted and moves away from the boundary a sufficient distance, the sensing coil signals disappear from the leads 368 and the clutch-brake coils are deenergized. Spring 390 causes the lever and the core mounted on it to move clockwise to its initial position as illustrated in FIG. 11 freeing the sleeve 350 so that it may rotate with the drive shaft 54 and drive hub 312 of FIG. 12. The simplified clutch-brake assembly of FIGS. 11 and 12 provides for more reliable operation of the unit and assures a more positive clutching and braking action.

The self-propelled mower of the present invention finds particular utility for use by the aged and infirm who cannot readily attend to their lawn and do not wish to hire out this work. If the area of the lawn to be cut includes natural obstacles, such as trees or the like, they can simply be surrounded by wire of the loop 14 or by a wire connected to the loop so that they constitute part of the boundary and the machine turns away before actually contacting the tree or obstacle. As previously mentioned, the lawnmower will climb substantial grades so that the lawn area to be cut need not be level. While described in conjunction with a preferred embodiment in which the self-propelled lawnmower is battery operated and carries its own battery, it is understood that the present invention is also applicable to random motion units where battery 70 is replaced by a gasoline engine or other motive source. Likewise, while described in conjunction with cutting blades for mowing a lawn, it is apparent that the present invention is applicable to all types of random motion self-propelled vehicles, including but not limited to toys, agricultural implements and the like. As previously mentioned, by plugging a leash into the control box, the lawnmower may be manually controlled by simply walking along behind it and manipulating a control unit at the end of the leash. This is particularly desirable for propelling the unit to and from a storage location and the leash also may be used for trimming areas at and outside the boundary wire which might not be reached by the mower during random operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meansing and range of equivalency of the claims are therefore intended to be embraced therein.

What is claimed and desired to be secured by United States Letters Patent is:

1. A self-propelled random motion lawnmower comprising a frame, a pair of rear drive wheels on said frame, a pair of caster mounted front wheels on said frame, a battery powered motor on said frame, an output shaft coupled to said drive motor, clutch and brake means coupling said shaft to said drive wheels, a pair of battery operated rotor motors on said frame, oppositely rotatable lawnmower cutter blade assemblies coupled to said rotor motors, a pair of front sensing coils on said frame, a pair of side sensing coils on said frame, means coupling the left front and left side sensing coils to the clutch and brake means for the right drive wheel of said vehicle, and means coupling the right front and right side sensing coils to the clutch and brake means for the left drive wheel, whereby the drive wheel furthest from a boundary is uncoupled from said output shaft and braked when the signal to said coils exceeds a predetermined level.

2. Apparatus according to claim 1 wherein said clutch and brake means comprises a separate combination clutch-brake having a solenoid operated coil spring coupling said shaft to each drive wheel.

3. Apparatus according to claim 1 wherein each said cutter blade assembly comprises a dish-shaped rotor with a flat annular rim to which is pivoted a plurality of cutter blades.

4. Apparatus according to claim 3 including a cross bar on said frame supporting said cutter blade assemblies, and means coupled to said cross bar for adjusting the height of each of said assemblies.

5. A self-propelled random motion device comprising a frame, a pair of drive wheels and at least one pivotally mounted wheel supporting said frame, a motor carried by said frame, means on said frame coupling said motor to said drive wheels, sensing means carried by said frame for sensing when said device approaches a predetermined boundary, and means responsive to said sensing mean for uncoupling said motor from one of said drive wheels to cause said device to turn away from said boundary, said sensing means including means for maintaining said one drive wheel uncoupled from said motor until said device has turned to an angle of departure from said boundary slightly greater than its angle of approach to said boundary.

6. Apparatus according to claim 5 wherein said angles differ by five degrees.

7. Apparatus according to claim 5 wherein said uncoupling means comprises means for stopping rotation of said one drive wheel.

8. Apparatus according to claim 5 including lawnmower cutting means mounted on said frame.

9. Apparatus according to claim 8 wherein said lawnmower cutting means comprises a pair of rotary blade assemblies rotatable in opposite directions.

10. Apparatus according to claim 8 including a battery on said frame, and means coupling the output of said battery to said drive wheels.

11. Apparatus according to claim 8 including a gasoline engine mounted on said frame for propelling said device.

12. A self-propelled random motion lawnmower comprising a frame, a pair of drive wheels and at least one pivotally mounted wheel supporting said frame, a battery powered motor on said frame, coupling means connecting said motor to said drive wheels, a rotary lawnmower cutter blade assembly mounted on said frame, a pair of sensors mounted adjacent the front of said frame for sensing when said mower approaches a predetermined boundary, at least one additional sensor mounted rearwardly of said front sensor, and means responsive to said sensors for uncoupling said motor from the drive wheel furthest from said boundary and maintaining said wheel uncoupled until said lawnmower has turned away from said boundary to an angle of departure slightly greater than the angle of approach of said lawnmower to said boundary.

13. Apparatus according to claim 12 including means on said frame responsive to said sensors for braking said furthest drive wheel while it is uncoupled from said motor.

14. Apparatus according to claim 12 wherein said sensors are electrical coils for sensing AC electrical signals from a boundary wire.

References Cited

UNITED STATES PATENTS

| | | | |
|---|---|---|---|
| 2,521,262 | 9/1950 | Smith | 56—(COND. RESP. DIG.) |
| 3,040,502 | 6/1962 | Smith | 56—6 |
| 3,052,076 | 9/1962 | Bambi | 180—77UX |
| 3,073,409 | 1/1963 | Daifotes | 180—79.1X |
| 3,128,840 | 4/1964 | Barrett, Jr. | 180—77 |
| 3,130,803 | 4/1964 | Wiggins | 180—79.1X |

BENJAMIN HERSH, Primary Examiner

J. A. PEKAR, Assistant Examiner

U.S. Cl. X.R.

180—6.2, 79.1, 98

PO-1050
(5/69)

UNITED STATES PATENT OFFICE
CERTIFICATE OF CORRECTION

Patent No. 3,570,227      Dated    March 16, 1971

Inventor(s)    S. L. Bellinger

It is certified that error appears in the above-identified patent and that said Letters Patent are hereby corrected as shown below:

Column 1, line 64, "quite" should read --quiet--.
Column 2, line 6, after "cable" insert -- energized from a suitable power supply such as an --. Column 4, line 45, "kHz" should read -- KHz --. Column 4, line 60, "fasion" should read -- fashion --. Column 6, line 73, "an" should read -- in --. Column 7, line 23, "shaft 164" should read -- shaft 154 --. Column 8, line 59, "diode 266 normally" should read --diode 266. Normally --. Column 9, line 29, "witht" should read -- with --. Column 9, line 48, "moved" should read -- mowed --. Column 10, line 5, "control" shou read -- controls --.
     Column 13, line 40 (claim 5), "mean" should read -- means --.

Signed and sealed this 9th day of November 1971.

(SEAL)
Attest:

EDWARD M. FLETCHER, JR.
Attesting Officer

ROBERT GOTTSCHALK
Acting Commissioner of P